May 11, 1954     J. R. BROWN ET AL     2,678,434
ELECTRICALLY OPERATED BOILER ALARM CONTROL DEVICE
Filed Sept. 22, 1949     2 Sheets-Sheet 2

INVENTOR.
JOHN ROWLAND BROWN
ROY LEE GILBERT
BY

Patented May 11, 1954

2,678,434

UNITED STATES PATENT OFFICE 2,678,434

ELECTRICALLY OPERATED BOILER ALARM CONTROL DEVICE

John Rowland Brown and Roy Lee Gilbert, Cleveland, Ohio, assignors to The Reliance Gauge Column Company Application September 22, 1949, Serial No. 117,184

6 Claims. (Cl. 340—244)

Our invention relates in general to a device for controlling an electrically operated boiler alarm, and especially to the using of the difference of resistance of the fluids in the manometer to bias grids of vacuum tubes which control electronically a boiler alarm.

It is well understood that many devices have been constructed for indicating the high and the low water levels in boilers. These devices may either operate lights or loud horns which indicate an alarm when the water level in a boiler has reached a dangerously high or a dangerously low water level. The prior art has suggested the use of a metallic float which floats inside a coil to change the impedance of the coil for causing an electronic circuit to sound an alarm. Other devices have used probes which become connected electrically together when the water touches the probes to operate an alarm. In these instances where water closes the circuit between the probes an open circuit is caused between the probes by air when the water drops below the level of the probes. With this arrangement there is either an open circuit or a closed circuit. The prior art also indicates that this arrangement of having either an open circuit or a closed circuit has been used in connection with an electronic amplifier whereby low voltages and currents exist between the probes.

In the present invention the probes are connected in the grid circuits of electronic valves which control the operation of electrical alarms. These probes are positioned in a manometer connected to the boiler and installed to visibly indicate the water level in the boiler. Since there is fluid in the manometer at all times, the probes are always in a closed circuit relationship. The manometer fluid has a much higher resistance than water whereby the electronic valves are controlled by the change of resistance in the grid circuit. In this particular instance the applicants are using an electronic circuit wherein the resistance of the manometer fluid is higher than the resistance of water and the tubes are arranged to fire or operate a relay when the water covers the probes. When the manometer fluid is included in the grid circuit by its contacting the probes, the tubes do not fire. The firing or non-firing of the tubes is used to control relays to cause an alarm.

One of the objects of our invention is to provide an electrically operated boiler alarm controlled by a manometer.

Another object of our invention is to use the difference of resistance of manometer fluid and water to bias the grids of vacuum tubes which control a boiler alarm.

Another object of our invention is to maintain a potential difference between the grid and cathode of an electronic control for a boiler alarm by including the fluid in a manometer in the grid circuit.

Another object of our invention is to provide an electronic control circuit for a boiler alarm which will cause the alarm to operate when a tube or valve in the electronic circuit fails.

Another object of our invention is to make the potential difference between the grid and cathode of a boiler-alarm electronic-control valve dependent on the resistance of the fluid in a manometer connected to the boiler.

Other objects and a fuller understanding of the invention may be had by referring to the following description and claims, taken in conjunction with the accompanying drawing, in which:

Figure 1:
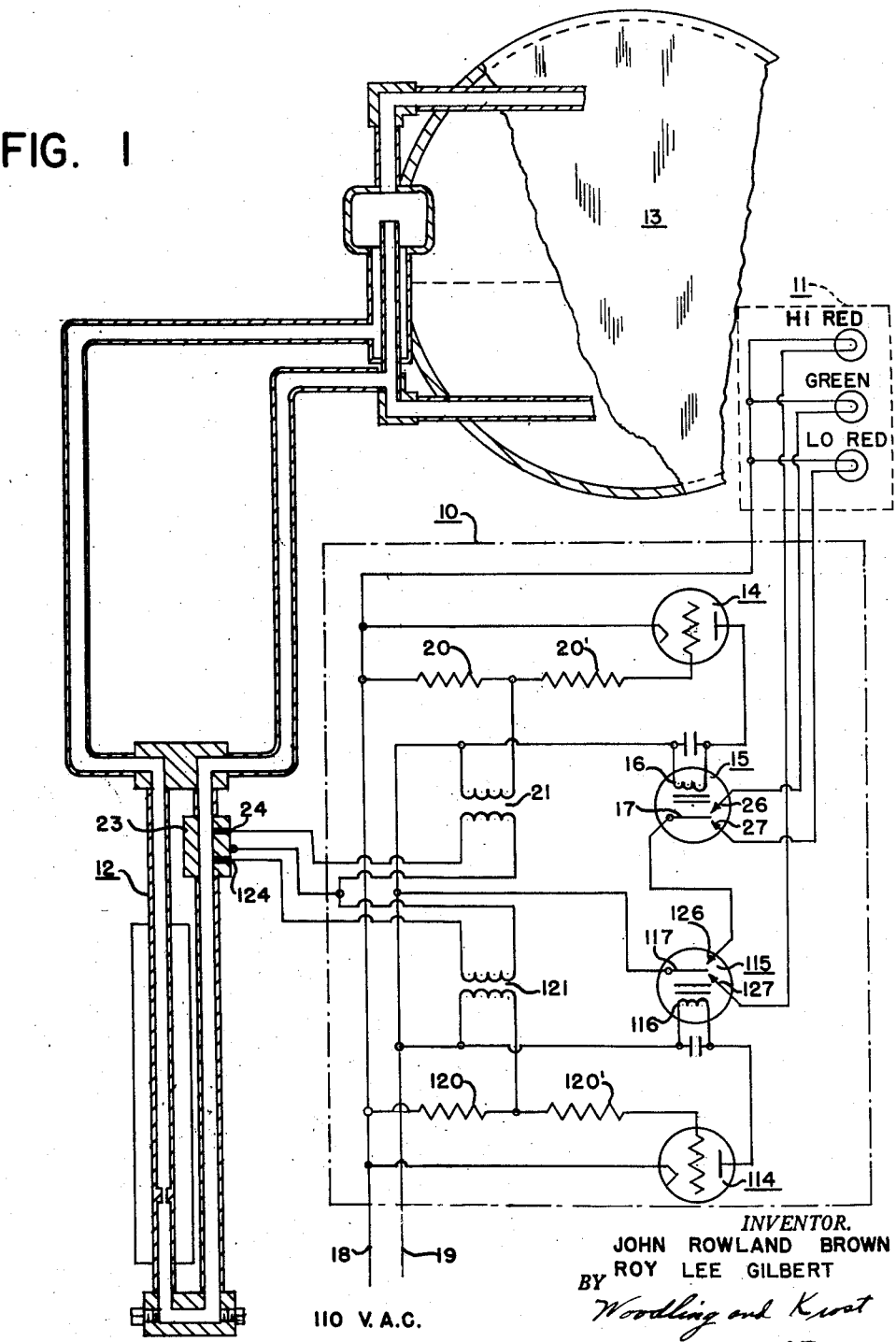
Figure 1 is a diagrammatic view of a boiler manometer and an electrically operated boiler alarm electronically controlled by the fluid in the manometer.
Figure 2:
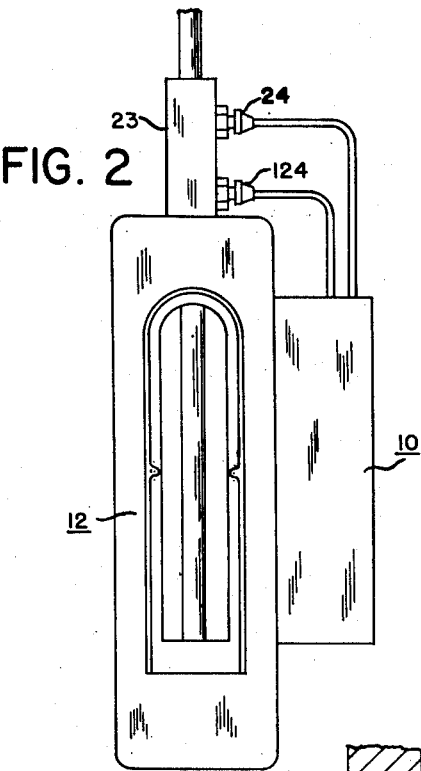
Figure 2 is a front view of a manometer showing the attaching of the electronic unit thereto.
Figure 3:
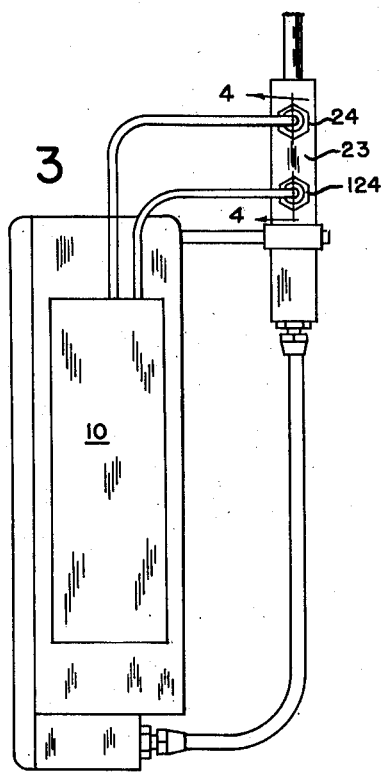
Figure 3 is a side view of the unit shown in Figure 2.

Our electrically operated boiler alarm control device is diagrammatically illustrated in Figure 1 of the drawing. The device includes an electronic unit 10 for controlling the operation of an alarm 11. This electronic unit 10 is electrically connected to a manometer 12 of a boiler 13. In Figures 2 and 3 of our drawings we best illustrate that the electronic unit 10 may be mounted in a housing which is supported by the manometer 12 and fastened to the side thereof. The manometer 12 illustrated in the drawing is a hydrostatic manometer, such, for example, as those manufactured and sold under the trade name "Reliance Eye-Hye." In this particular instance the manometer fluid used in the manometer 12 is a fluid having a density of between 1.5 and 2 and having a resistance approximately 20 times the resistance of water. A suitable manometer fluid for this purpose is manufactured and sold under the trade name "Vizzene" which has either a base of bromine, bromobenzene or halogenated alkyl benzene, sold at the present time under the trade name "Alkazene." We wish it understood that we do not limit the types of manometer fluids which can be used to the particular ones mentioned herein, and that we mention a particular manometer and particular manometer fluid by way of example for a specific construction of our invention.

The specific alarm which we have illustrated herein has a high red light which indicates that the water in the boiler is at a dangerously high water level, a green light which indicates that the water level in the boiler is at a safe level, and a low red light which indicates that the water level in the boiler is at a dangerously low level. We have used the colored lights to give visible indication, but wish it understood that horns or other noise-making devices may be used in place of the lights without departing from the spirit and scope of our invention. The alarm 11 may be mounted in an office or at a station remote from and thus at a distance from the boiler and the manometer.

The electronic circuit which we have found to be very practical, and which is diagrammatically illustrated in Figure 1, comprises a pair of electronic valves each operating a relay for controlling the energization of the lights in the alarm 11. For purposes of description the electronic valves are numbered 14 and 114. The relays which are operated by these electronic valves are numbered 15 and 115. The relay 15 is connected in the plate circuit of the electronic valve 14, and the relay 115 is connected in the plate circuit of the electronic valve 114.

The electronic valves 14 and 114 in this specific embodiment are triodes, such, for example, as OA4G radio tubes. The relays used in this specific example are common single-pole double-contact relays termed as a 4IRO relay. The relays 15 and 115 have energizable coils 16 and 116 respectively, which throw the relay switch arms 17 and 117 respectively against a contact which is connected to one of the lights.

The electronic unit 10 is operated on a 110-volt alternating current source of power. The source of power is represented in the drawings by the lines 18 and 19. We have connected the control grid of the electronic valve 14 to the line 18 by means of a divided series resistance 20—20', and the control grid of the electronic valve 114 to the line 18 by series resistance 120—120'. The cathodes of the electronic valves are both connected to the line 18. The plate of the electronic valve 14 is connected to the coil 16 of the relay 15, the other side of which is connected to the line 19. Similarly, the plate of the electronic valve 114 is connected to one side of the coil 116 in relay 115 and the other side of the coil is connected to the line 19. A transformer 21 is provided for the grid circuit of electronic valve 14, and the transformer 121 is provided for the grid circuit of electronic valve 114. The primary of the transformer 21 has one end thereof connected to the line 19 and the other end thereof connected to and between the series rsistances 20 and 20'. Similarly, the primary of the transformer 121 has one end thereof connected to the line 19 and the other end thereof connected to and between the series resistances 120 and 120'. One side of the secondary of each of the transformers 21 and 121 is connected to the shell of the manometer or to ground, and the other side of each secondary is connected to its respective probe which is insulated from ground and extends into the manometer tube to engage the fluid therein.

Figure 4:
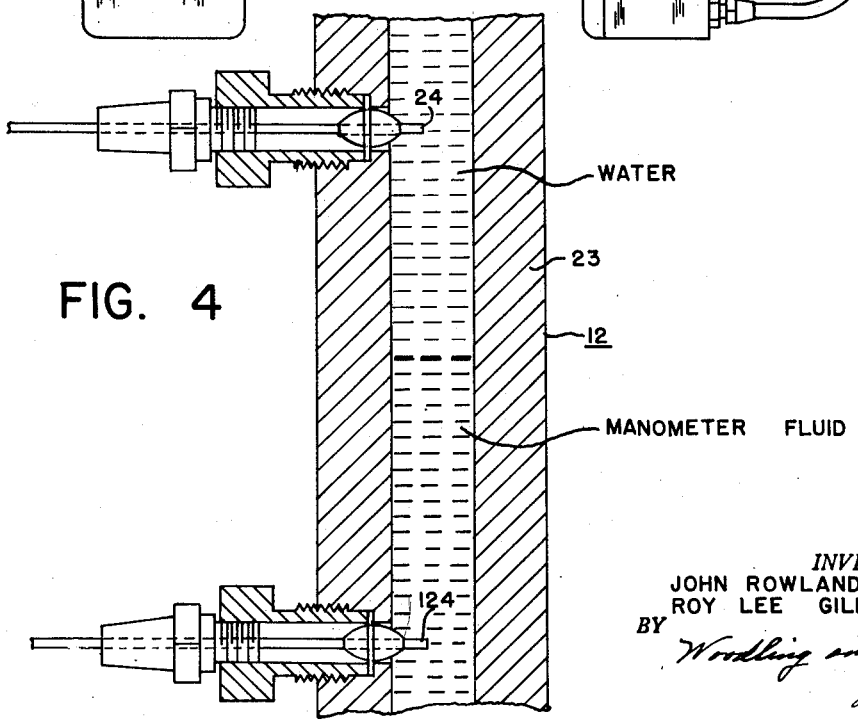
Figure 4 is an enlarged fragmentary view taken along line 4—4 of Figure 3.

In Figures 2, 3 and 4 of our drawings we best illustrate the connection of the transformers to the probes and to the manometer tubes. The manometer tube of manometer 12 is provided with an elongated housing 23 having vertically spaced openings in the wall thereof. During the operation of the manometer the manometer fluid rises and falls with the water on top of it in this housing 23. A probe 24 which is connected to the transformer 21 is threaded into the uppermost of these vertical openings in the housing 23, and a probe 124 which is connected to the transformer 121 is threaded into the lowermost of the openings in the housing 23. Each of these probes is constructed from an electrically conducting rod having insulation molded thereabout to insulatingly support the rod in the housing 23. An electrical resistance circuit is established between the probe 24 and the housing 23, and also between the probe 124 and the housing 23 through the fluid surrounding the respective probe. In this manner the resistance of the fluid in the manometer is electrically connected in the grid circuit of the electric valve to maintain a potential difference between the grid and cathode of the valve. When Vizzene is the electrical resistance connection between the probe and the wall of the tube, the electrical resistance connected directly across the secondary of the transformer is approximately 20 times the resistance across the secondary of the transformer when water is the electrical conductor. We have discovered that with the probe always in either water or manometer fluid a grid bias is always maintained on the grid of the respective electronic valve.

The relay 15 has opposing switch points 26 and 27 between which the switch arm 17 moves. Similarly, the relay 115 has opposing switch points 126 and 127 between which the switch arm 117 moves. The switch point 26 is connected to one side of the green light, and the switch point 27 to one side of the low red light. The switch point 126 of relay 115 is connected to the switch arm 17 of relay 15, and the switch point 127 is connected to the high red light of the alarm 11. The other side of each of the lights in the alarm 11 is connected to the line 18 of the source of electrical energy, and the switch arm 117 is connected to the line 19.

Energization of the coil 16 in relay 15 moves the switch arm 17 against switch point 26 to cause lighting of the green light. Energization of the coil 116 of relay 115 causes the switch arm 117 to engage the switch point 127, thus lighting the high red light. Nonenergization of the coil 16 in relay 15 permits the switch arm 17 to contact switch point 27, thus lighting the low red light, providing the switch arm 117 in relay 115 is contacting the switch point 126.

In the operation of our electronic device for maintaining a closed grid circuit, the level of the manometer fluid determines which light will be lit. It is well known in the field of manometers that the surface level of manometer fluid is dependent on the level of the water in the boiler. When the water level in the boiler 13 goes down the surface level of the Vizzene in the manometer goes up, whereby the Vizzene covers the top probe 24. This covering of the top probe 24 by the Vizzene causes a change in the resistance in the secondary circuit of the transformer 21 and stops the firing of the tube 14, thereby putting the coil 16 in a nonenergized condition. When the coil 16 is not energized the switch arm 17 engages the contact 27, causing the low red light to light, thereby giving a visible alarm that the water level in the water tank 13 has reached a dangerously low condition.

When the water level in the tank goes up the surface level of the Vizzene in the housing 23 drops, whereby water electrically connects the bottom probe 124 to ground or to the housing 23. The resistance of the water being different than the resistance of the Vizzene causes a change in the resistance in the secondary of transformer 121, thereby changing the potential difference between the grid and cathode of valve 114. This change in potential causes the tube to fire or the valve to energize the coil 116 in relay 115, thereby connecting switch arm 117 to contact 127 to light the high red light of the alarm 11.

When the water level in the boiler 13 is at a safe level, electrical connection between the probe 24 and ground is made by water, and electrical connection between the probe 124 and ground is made by the Vizzene. At this time the green light is lit, since the valve 14 is closed and the coil 16 of relay 15 is energized, and the switch arm 117 of relay 116 is engaging switch contact 126. The switch arm 117 is connected directly to the line 19 of the source of energy.

One of the advantages of our electronic circuit is that the low red light will light if either or both of the electric valves 14 or 114 fail. When either or both of these valves fail their respective relays will be nonenergized, thus permitting the closed circuit from line 19 through both relays, the low red light, and back to the line 18.

Although we have described the particular tubes and relays used in our circuit and the particular fluid used in the manometer, it is understood that we do so by way of specific example, and that similar tubes and relays and fluids may be used without departing from the spirit and scope of our invention. A potential difference is always maintained between the grid and cathode of the electric control valves or tubes 14 and 114 since a fluid is always electrically connected in the grid circuit by the probes 24 and 124. Therefore, the operation of the valves is entirely dependent on which fluid is electrically connected in series between the probe of that respective valve and ground, or the housing 23.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electrical circuit having two different conditions in accordance with the level of first and second fluids in a fluid system, said fluids having different electrical resistivities and also having different specific gravities to define a line of demarcation therebetween, said electrical circuit comprising, a probe adapted to engage one of said fluids, an indicator, an electron discharge device connected to said indicator for control of same, said electron discharge device having a cathode and a control electrode, an alternating current bias circuit adapted to be connected to an alternating current source, an impedance in said bias circuit, impedance transformer means in said bias circuit having a primary and a secondary with the secondary connected to said impedance, return current means for said probe, means for connecting the primary of said impedance transformer means to said probe and to said return current means, and means for connecting one of said transformer secondaries and said impedance in the cathode-control electrode circuit of said electron discharge device to control the bias and conductivity of said electron discharge device.

2. An electrical circuit having two different conditions in accordance with the level of first and second fluids in a fluid system, said fluids having different electrical resistivities and also having different specific gravities to define a line of demarcation therebetween, said electrical circuit comprising, a first probe adapted to engage the high resistance fluid, a second probe adapted to engage the low resistance fluid, first and second indicators, a relay connected to operate said first and second indicators, an electron discharge device connected to said relay for control of same, said electron discharge device having a cathode and a control electrode, an alternating current bias circuit adapted to be connected to an alternating current source, an impedance in said bias circuit, impedance transformer means in said bias circuit, said transformer means having primary winding means and secondary winding means with the secondary winding means connected in series with the impedance, return current means for said first and second probes, means for connecting said primary winding means to said first and second probes and to said return current means, and means for connecting one of said secondary means and impedance in the cathode-control electrode circuit of said electron discharge device to control the bias and conductivity of said electron discharge device.

3. An electrical circuit having two different conditions in accordance with the level of first and second fluids in a fluid system, said fluids having different electrical resistivities and also having different specific gravities to define a line of demarcation therebetween, said electrical circuit comprising, a first probe adapted to engage the first fluid, a second probe adapted to engage the second fluid, first and second indicators, first and second electron discharge devices connected to said first and second indicators, respectively, for control of same, each of said electron discharge devices having a cathode and a control electrode, first and second alternating current bias circuits adapted to be connected to an alternating current source, an impedance in each of said bias circuits, first and second impedance transformers in said first and second bias circuits, each transformer having a primary and a secondary with the secondary of each transformer connected to the impedance in the respective bias circuit, return current means for said first and second probes, means for connecting the primary of said first transformer to said first probe and to said return current means, means for connecting the primary of said second transformer to said second probe and to said return current means, and means for connecting one of said transformer secondaries and said impedances in the cathode-control electrode circuit of each of said electron discharge devices, to control the bias and conductivity of said electron discharge devices.

4. A high and low level alarm system for a liquid container with a manometer indicating the liquid level in said container, said manometer containing high and low resistance fluids with the high resistance fluid of higher density than said low resistance fluid, said alarm system comprising, a first probe adapted to engage the high resistance fluid, a second probe adapted to engage the low resistance fluid, an electrical circuit including a high and low level alarm, first and second relays connected to operate said high and low level alarms, respectively, first and second electron discharge devices connected to said first and second relays, respectively, for control of same, each of said electron discharge devices having a cathode and a control electrode, first and second alternating current bias circuits adapted to be connected in parallel to an A. C. source, an impedance in each of said bias circuits, first and second impedance transformers in said first and second bias circuits, each transformer having a primary and a secondary with the secondary of each transformer connected in series with the impedance in the respective bias circuit, return current means for said first and second probes, means for connecting the primary of said first transformer to said first probe and to said return current means, means for connecting the primary of said second transformer to said second probe and to said return current means, and means for connecting said first and second impedances in the cathode-control electrode circuit of said first and second electron discharge devices, respectively, to control the bias and conductivity of said electron discharge devices.

5. An alarm system for a liquid container with a manometer indicating the liquid level in said container, said manometer containing high and low resistance fluids with the high resistance fluid of higher density than said low resistance fluid, said alarm system comprising, a probe adapted to engage the low resistance fluid, an electrical circuit including an alarm, an electromagnetic relay operable by a coil and connected to operate said alarm, an electron discharge device having a cathode, control grid, and anode, first and second lines connectable to an alternating current source, the anode connected through the coil of the relay to said first line to operate said relay, an alternating current biasing resistor and a current limiting resistor connected in series between the grid and said second line of said electron discharge device, said cathode being directly connected to said second line, an impedance transformer having a primary and a secondary, means for connecting said secondary between said first line and the junction of the resistors, return current means for said probe, and means for connecting said primary between said return current means and said probe.

6. A high and low level alarm system for a liquid container with a manometer indicating the liquid level in said container, said manometer containing high and low resistance fluids with the high resistance fluid of higher density than said low resistance fluid, said alarm system comprising, a first probe adapted to engage the high resistance fluid, a second probe adapted to engage the low resistance fluid, an electrical circuit including a high and low level alarm, first and second electromagnetic relays each operable by a coil and connected to operate said high and low level alarms, respectively, first and second electron discharge devices each having a cathode, control grid, and anode, first and second lines connectable to an alternating current source, the anodes connected through the coils of the respective relays to said first line to operate said relays, an alternating current biasing resistor and a current limiting resistor connected in series between the grid and said second line on each of said electron discharge devices, respectively, each of said cathodes being directly connected to said second line, first and second impedance transformers each having a primary and a secondary, means for connecting each said secondaries between said first line and the junction of the resistors, respectively, common return current means for said probes, and means for connecting said first and second primaries between said return current means and said first and second probes, respectively.

References Cited in the file of this patent

UNITED STATES PATENTS

| Number | Name | Date |
|---|---|---|
| 1,463,986 | Whirland | Aug. 7, 1923 |
| 1,710,499 | Lewis | Apr. 23, 1929 |
| 1,774,433 | Gardiner | Aug. 26, 1930 |
| 2,261,495 | Ewertz | Nov. 4, 1941 |
| 2,385,161 | Pinkerton | Sept. 18, 1945 |
| 2,388,812 | Albin | Nov. 13, 1945 |
| 2,394,220 | Wagner | Feb. 5, 1946 |
| 2,468,791 | Thomson | May 3, 1949 |
| 2,503,654 | Centofanti | Apr. 11, 1950 |